United States Patent [19]

Faris

[11] Patent Number: 5,264,964
[45] Date of Patent: Nov. 23, 1993

[54] MULTI-MODE STEREOSCOPIC IMAGING SYSTEM

[76] Inventor: Sades Faris, 24 Pocantico River Rd., Pleasantville, N.Y. 10532

[21] Appl. No.: 809,136

[22] Filed: Dec. 18, 1991

[51] Int. Cl.$^5$ .................. G02B 27/22; G02B 27/26
[52] U.S. Cl. ................................ 359/465; 359/464
[58] Field of Search ............................... 359/464, 465

[56] References Cited

U.S. PATENT DOCUMENTS 5,007,715  4/1991  Verhulst .................. 359/465 X

Primary Examiner—Scott J. Sugarman

[57] ABSTRACT

A multi-mode stereoscopic imaging system is described. It is the first stereo system which is convertible back and forth from the auto stereo viewing mode without glasses to the binocular stereo viewing mode with glasses. It is based on micro-polarizer arrays and spatial multiplexing of images. The system consists of a stereo image component and an auto parallax barrier component. Both components use the properties of $\mu$Pols. Switching from one mode to the other is accomplished manually, and electronically with the aid of a liquid crystal light valve. The system combines the benefits of auto-stereo imaging and the binocular stereo imaging of prior art techniques without their limitations.

37 Claims, 9 Drawing Sheets

OR

MULTI-MODE STEREOSCOPIC IMAGING SYSTEM

BACKGROUND OF THE INVENTION

1. Field of the Invention

This invention relates in general to the field of 3-D stereo imaging and display systems, including 3-D stereo video computer graphics displays, stereo photographic systems, 3-D movies, and 3-D stereo printers.

2. Description of Related Art

This application is identical to and replaces Applicant's Ser. No. 7/612,494, now abandoned which was unintentionally and inadvertently abandoned. Since the invention of the stereoscope in 1847 by David Brewster man continues his quest for copying natures 3-D images instead of being content with the planar 2-D images which lack the realism due to the absence of depth cues. Realistic 3-D imaging is compatible with our stereo vision. Many techniques have been devised and developed for producing 3-D images with varying degrees of success and image qualities. These techniques generally belong to two major classes (FIG. 1a), the Auto-Stereoscopic imaging class which produces 3-D images which can be viewed freely without spectacles, and the Binocular Stereoscopic imaging class which produces 3-D images which require the viewers to wear spectacles. Each of the two classes has a group of distinct techniques that have been used in some applications. My co-pending application Ser. No. 7/536,190 gives an overview of these techniques, their operating principles, their advantages and disadvantages. In Ser. No. 7/536,190, I introduced a new 3-D imaging technique based on spatial multiplexing of images and micro-polarizer arrays ($\mu$Pol) and pointed to its advantages over prior art techniques. It depends on the ability to manufacture the $\mu$Pols which is taught in my co-pending application Ser. No. 7/536,419, now abandoned. One of the major advantages of this so called $\mu$Pol imaging technique is that it can be used in a much wider application spectrum than prior techniques. Another advantage is its ability to overcome the shortcomings of prior art techniques. Many uses of the $\mu$Pol technology are described in co-pending applications Ser. No. 7/561,104, now U.S. Pat. No. 5,096,520; Ser. No. 7/554,743, now abandoned; Ser. No. 7/587,664, now U.S. Pat. No. 5,165,013; Ser. No. 7/554,742, now U.S. Pat. No. 5,121,343; Ser. No. 7/561,090, now abandoned; and Ser. No. 7/561,141, now abandoned.

This invention shows how the use of $\mu$Pol technology leads to a totally new and distinct 3-D stereo imaging class which is referred to as the Multi-Mode Stereoscopic Imaging class as shown in FIG. 1b. The main feature of this class is the convertibility from one viewing mode to another. It is capable, for instance, of producing 3-D images which can be viewed with no glasses (Auto-Mode) which can then be switched by the user to the Binocular Mode of viewing with glasses. The two prior art classes have either one viewing mode or the other but never both at the same time.

SUMMARY OF THE INVENTION

The principal object of the present invention is the use of $\mu$Pol technology to teach a new imaging class called the Multi-Mode Stereoscopic Imaging which is capable of producing stereo images which can be converted by the user into several viewing modes.

Another object of this invention is a multi-mode stereoscopic imaging system which combines the attractive features of the auto-stereoscopic imaging and the binocular imaging with the $\mu$Pol technology advantages resulting in a superior system.

DETAILED DESCRIPTION OF THE PREFERRED EMBODIMENTS

Figure 1A:
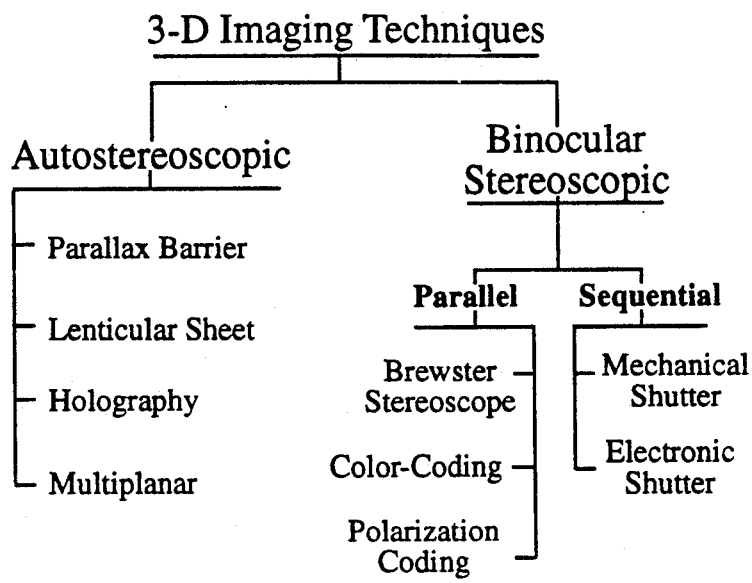
FIG. 1a illustrates the classification of prior art 3-D imaging techniques.
Figure 2:
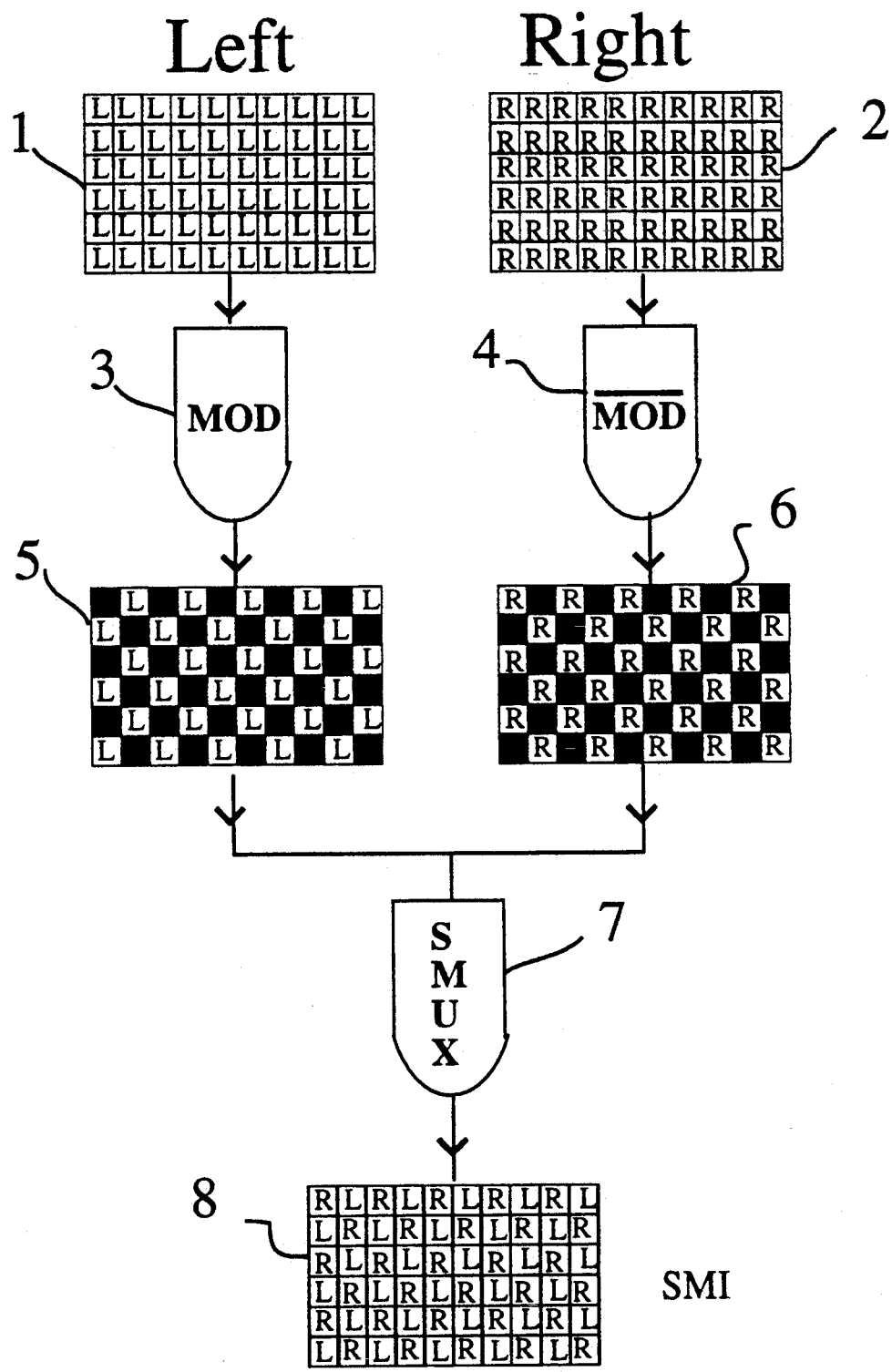
FIG. 2 illustrates the principles of spatial multiplexing of images.
Figure 3A:
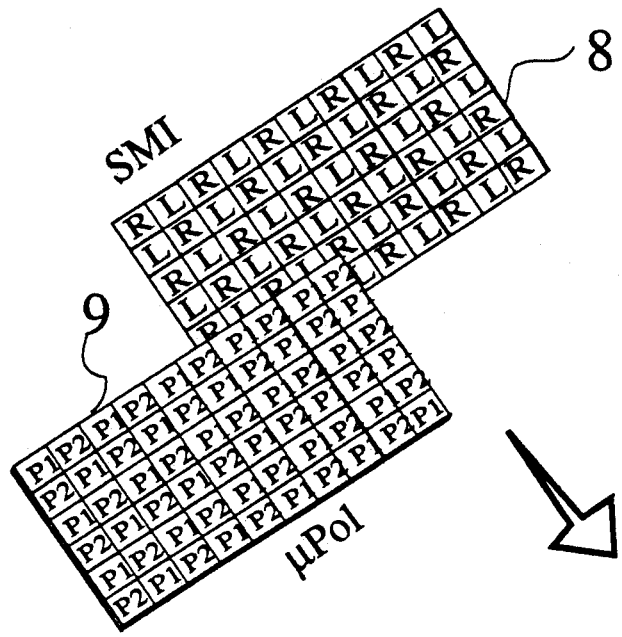
FIG. 3 shows the use of micro-polarizer sheets for demultiplexing and viewing of the spatially multiplexed image.
Figure 3B:
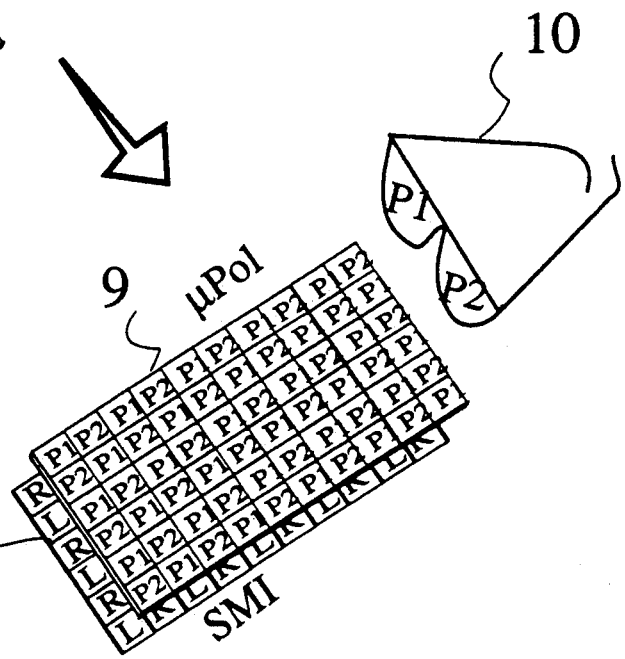
Figure 3C:
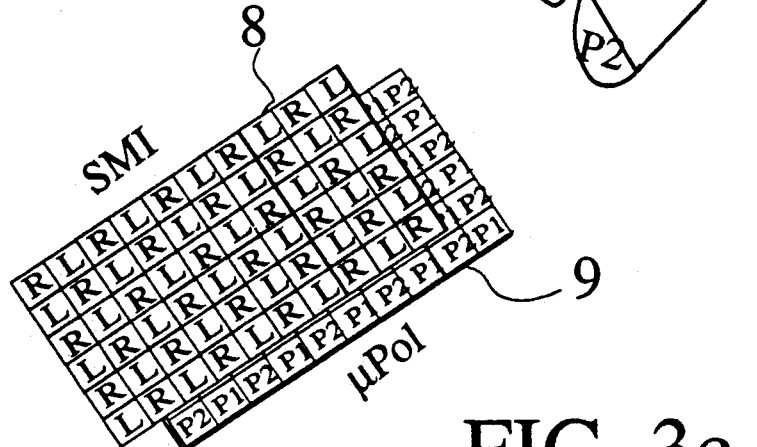

The invention is based on two fundamentally new concepts combined for the first time to record and display 3-D images. They are: Spatial Multiplexing of left and right images and Micro-Polarizers. These are described in my co-pending applications: "A System For Producing 3-D Stereo Images", Ser. No. 7/536,190, and "Methods For Manufacturing Micropolarizers", Ser. No. 7/536,419. FIG. 2 illustrates the spatial multiplexing principles. The data representing the left and right images are stored in a bit map format (other formats may also be used) in left memory array 1 (L-RAM), and right memory array 2 (R-RAM) respectively. Each pixel in the array has N-bits for color and gray-scale. Using a spatial checkerboard modulator MOD 3, the left image 1 is modulated and stored in the array 5. The right image is spatially modulated using the compliment of MOD 4 to produce the compliment pattern stored in array 6. The modulated images 5 and 6 are combined (multiplexed) using a spatial multiplexer 7 and the spatially multiplexed image (SMI) is stored in the array 8. The SMI 8 shows a combined left and right images side by side on a pixel by pixel basis and therefore carries the stereo information. The flow diagram of FIG. 2 is an algorithm to produce the SMI which can be implemented either in hardware or in software. In FIGS. 3a-b the SMI 8 is combined with a spatial demultiplexer 9, a micropolarizer, μPol sheet described in applications Ser. No. 7/536-190, and Ser. No. 7/536-419 and a polarization decoder 10, a pair of spectacles with polarization states P1 and P2. The SMI and the μPol arrays 9 which have the same period are aligned such that the left pixels in the SMI illuminate the P2 cells in the μPol array and the right pixels illuminate the P1 cells. Thus, the left pixels become P2 polarized and the right pixels become P1 polarized. Because of the discriminating ability of the polarized eye glasses, the left eye which has a P2 polarizer can seen only the P2-polarized left pixels, and the right eye which has a P1 polarizer can see only the P1-polarized right pixels. To achieve the 3-D stereo sensation the human brain fuses the left and right images in the same manner it deals with natural 3-D scenes. FIG. 1c shows that the SMI 8 may also be placed top of the μPol. Choosing between the configurations of FIG. 3b and FIG. 3c depends on how the SMI is illuminated, and whether the transmissive mode or reflective mode of display is used; see Ser. No. 536,190. The SMI may produced by a video display system such as CRT or liquid crystal display, or recorded on a paper from printers or photographic systems.

FIGS. 4a and 4b show the construction of a hardcopy. It comprises two sheets 11 and 12 laminated together to produce the output print 16. The first sheet 11 is a μPol 9 on which the SMI 8 is printed after proper alignment is ensured. The second sheet 12 consists of regular paper 13, coated with aluminum or silver flakes 14 and a clear adhesive layer 15. The aluminum or silver layer is needed to preserve the polarization and maximize the brightness. If paper only was used in 13, the polarized light striking its surface becomes depolarized and as it emerges from the μPol layer its brightness is reduced by at least 50%. FIG. 4c shows another simpler embodiment which eliminates the sheet 12 but achieves the same result by directly coating the back of the μPol 9 with a silver or aluminum film 14.

There are two classes of polarizer polymers; the absorptive class such as polyvinyl alcohol, PVA, and the reflective class such as cholesteric liquid crystal silicone, CLCS (see Robert Maurer et al, Society of Information Display SID 90 Digest, p. 110, 1990, and Martin Schadt, and Jurg Funfschilling, SID 90 Digest, p. 324, 1990). The absorptive class converts unpolarized light to linearly polarized light of state P1 by absorbing the orthogonal state P2. This absorbed light energy is converted to heat and is lost for ever. The polyvinyl alcohol, PVA, used to construct the μPols in Ser. No. 7/536,190, and Ser. No. 7/536,419 belongs to the absorptive class. Hard copies based on the absorptive class, in general, lose at least 50% of the illuminating light. The second polarizer class, reflective class, separates the incident unpolarized light into two circularly polarized states P1 and P2, one state P1 is transmitted and the other state P2 is reflected. In this case no light energy is lost to heat and therefore it is possible to convert 100% of the incident light into polarized light with the desired state of polarization. This is done by coating a sheet of CLCS with a reflective metallic film on one side, and illuminating it on the other side with unpolarized light. 50% of this light is reflected as P1, and the other 50% is transmitted as P2. This P2 light is then reflected by the metallic layer and converted into P1 (it is well known in the field of optics that a circularly polarized light of one state is converted to the orthogonal state as a result of reflection), thus all the incident light is converted to polarized light of state P1. This reflective class of polarizers when used to fabricate μπολσ, provides at least a factor of 2 brighter 3-D stereo images than the absorptive class.

Figure 4:
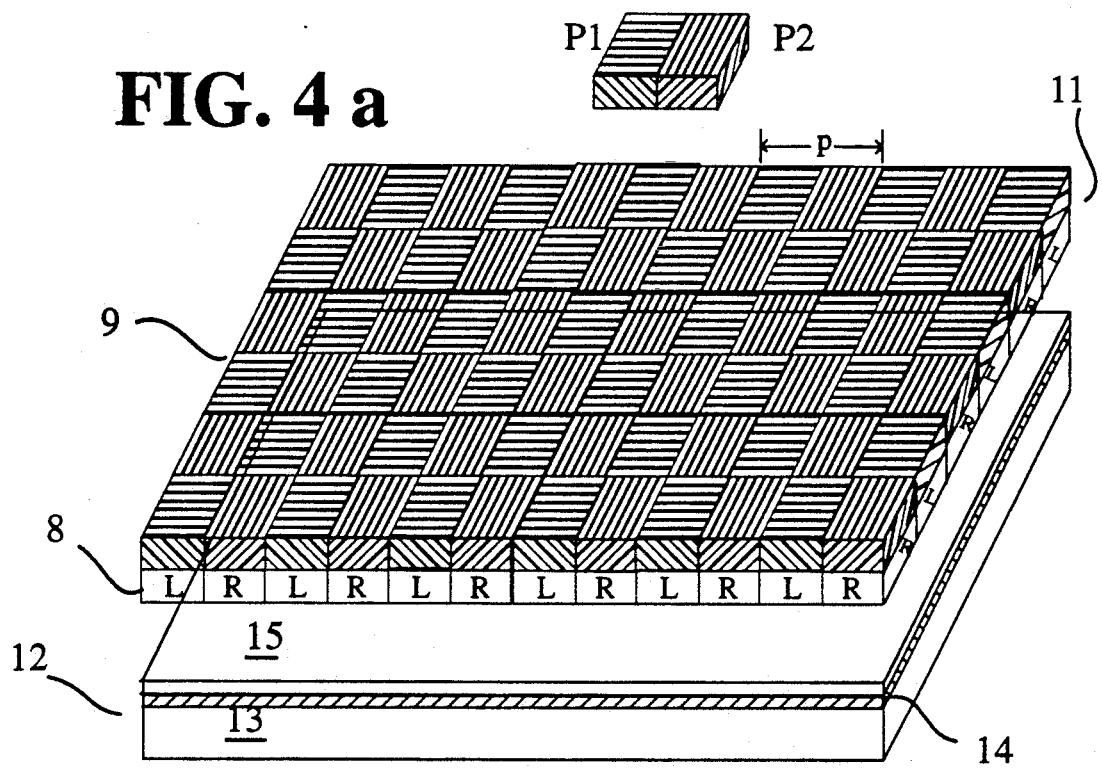
FIG. 4 shows the components of a 3-D image using $\mu$Pol technology in the form of a hard copy print.
Figure 4:
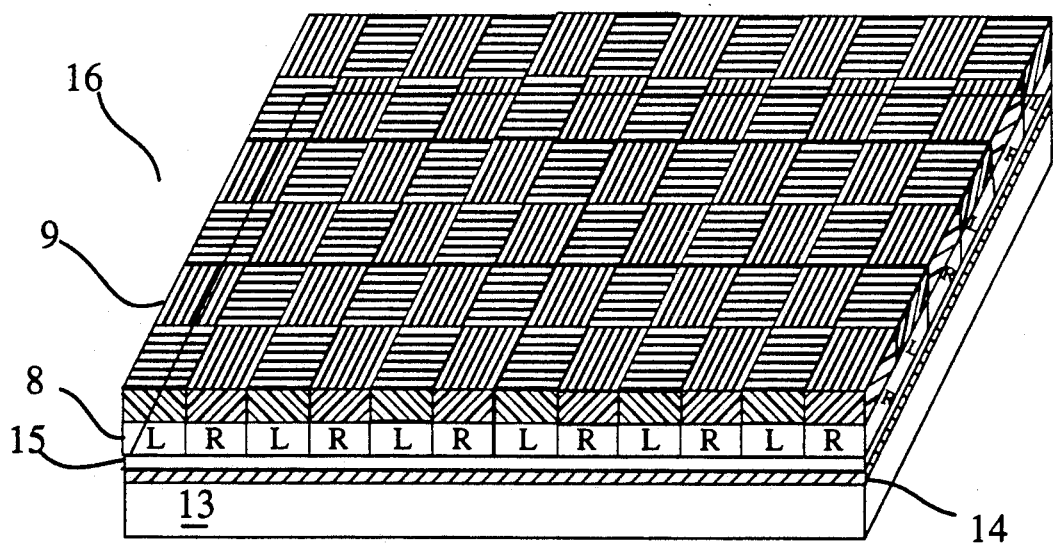
Figure 4:
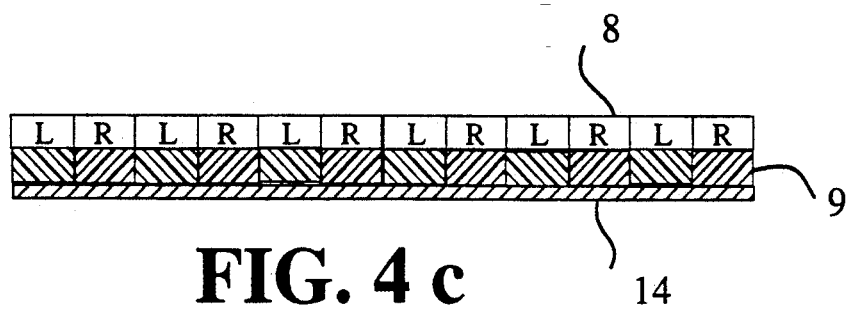
Figure 5A:
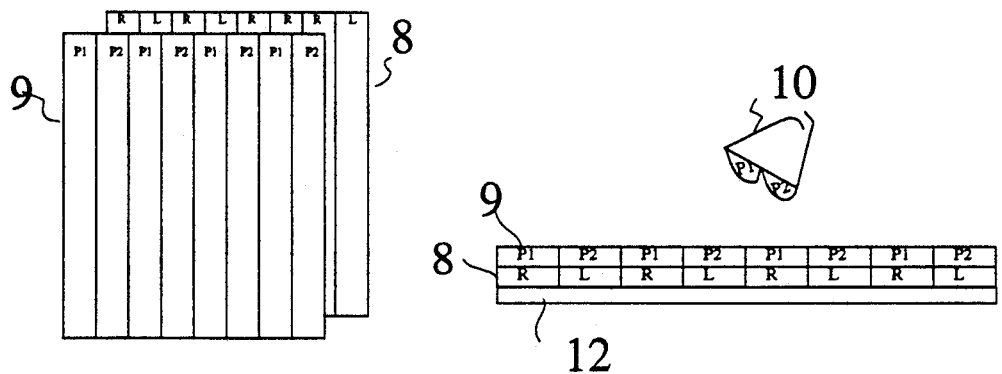
FIGS. 5a–c show the construction of a multi-mode stereo imaging system which the user can convert from one viewing mode to another.
Figure 5B:
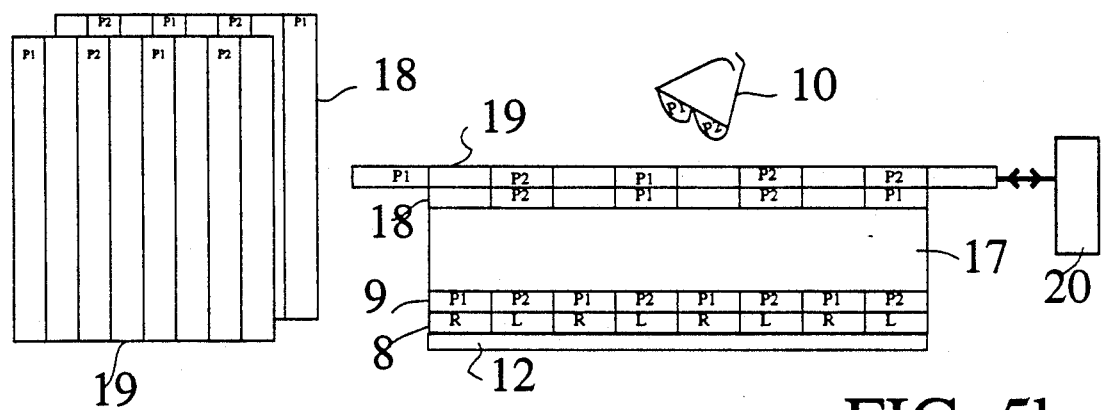
Figure 5C:
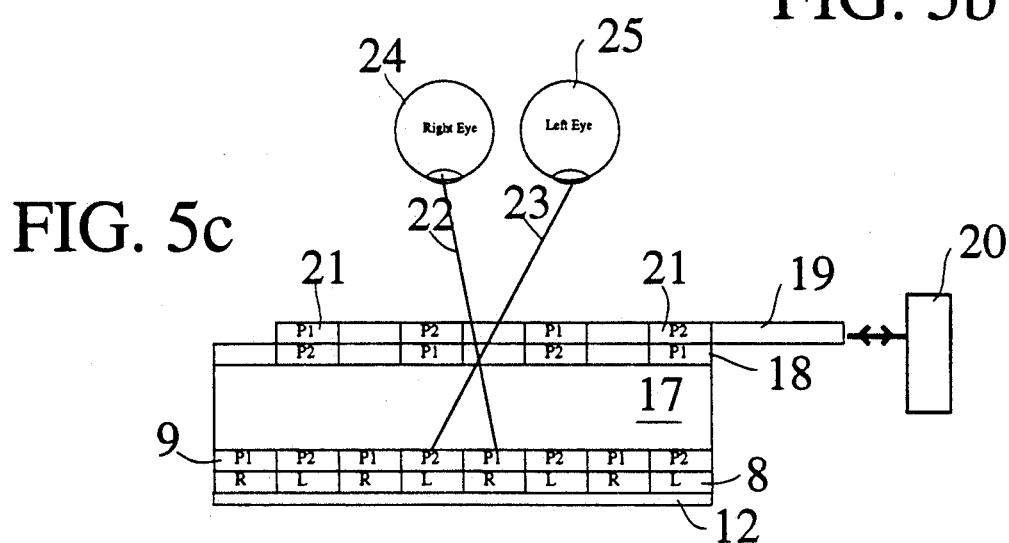
Figure 5D:
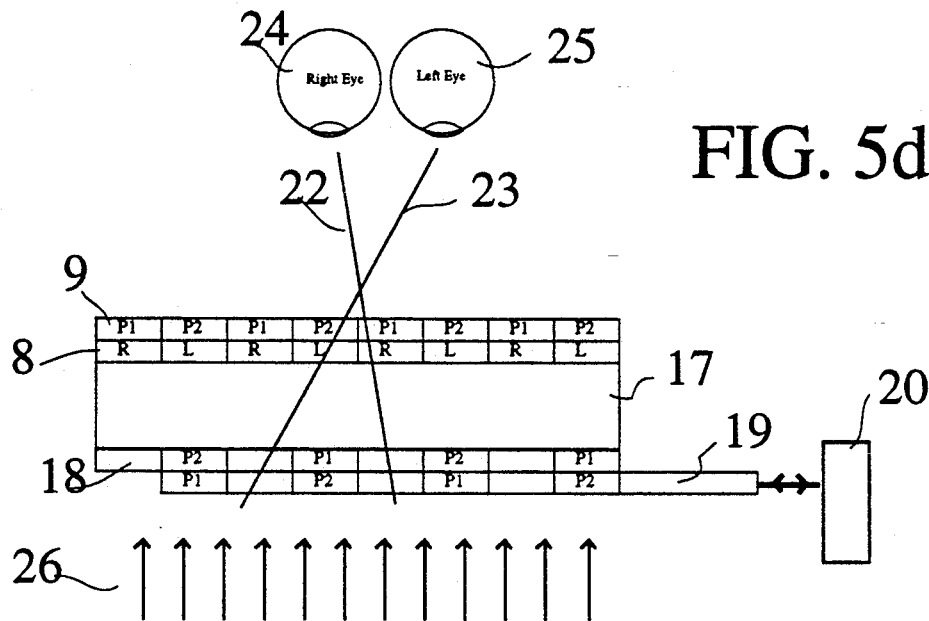
FIG. 5d shows a cross section of a mode-convertible image which can be viewed by light transmission.

The binocular stereo image in FIG. 5a is identical in construction to that of FIG. 4 except the SMI 8 and the μPol 9 are made of strips (linear array instead of 2-D array of pixels). The strip width, $W_S$, can be as small as 25 microns for photographs, or in the range of 100 to 250 microns for video displays. This system, FIG. 5a, is changed into a convertible multi-mode stereo imaging system by adding a second μPol 18 laminated to a clear substrate 17(polyester, acetate, or glass), and a third μPol 19 as shown in FIG. 5b. The μPol 18 and substrate 17 are fixed to the first μPol 9, whereas, μPol 19 is movable sideways (left and right) by means of a manual or electronic actuator. The spatial periods of μPol arrays 18 and 19 are identical and are twice the period of μPol 9. In FIG. 5b, μPol 19 is moved until the its polarization P1 regions overlap the P1 regions of μPol 18 and its the P2 regions overlap the P2 regions of μPol 18. In this position of μPol 19, and at an appropriate viewing distance $D_V$, the μPols 18 and 19 are transparent and the system remains in the binocular mode and eye glasses are still needed to view the image. However, by moving the μPol 19 until its P1 regions overlap the P2 regions of μPol 18, and its P2 regions overlap the P1 regions of μPol 18, the system is switched into the auto-mode and the image can be viewed without eye glasses. This is because of the parallax barrier created in the regions 21 where the different polarization states overlap. To achieve this auto mode, the thickness D of the substrate 17 is designed according to the following relation (S. H. Kaplan, Theory of Parallax Barrier, J. SMPTE, Vol. 59, 11–21, July 1952):

$$D = W_s D_v / (W_s + D_e);$$

where $D_e$ is the inter-pupil distance which is on the average 65 mm. For $W_s = 100$ micron, and $D_v = 40$ cm, D=600 micron. At this distance there exist viewing zones where all rays 22 emanating from the right pixels are viewed only by the right eye 24 and all rays 23 emanating from the left pixels are viewed only by the left eye 25. This is the condition of stereoscopic vision, and no spectacles are needed. Thus one is able to switch between the binocular viewing mode in FIG. 5b to the auto viewing mode in FIG. 5c. FIG. 5d shows another embodiment of the invention, a convertible multimode stereo system which is back lit by means of a light source 26. In this case the backing 12 is not needed, the SMI is a transparency, and the auto-mode components 17, 18, and 19 are moved in the back facing the light source 26. In FIG. 5d, μPol 19 is shown once again positioned so that its P1 and P2 regions form barriers (opaque regions) with the P1 and P2 regions of μPol 18. The rays 22 emerging from the clear regions between the barriers, illuminate the right pixels and strike only the right eye 24, meanwhile, the rays 23 emerging from the clear regions, illuminate the left pixels and strike only the left eye 25.

Figure 1B:
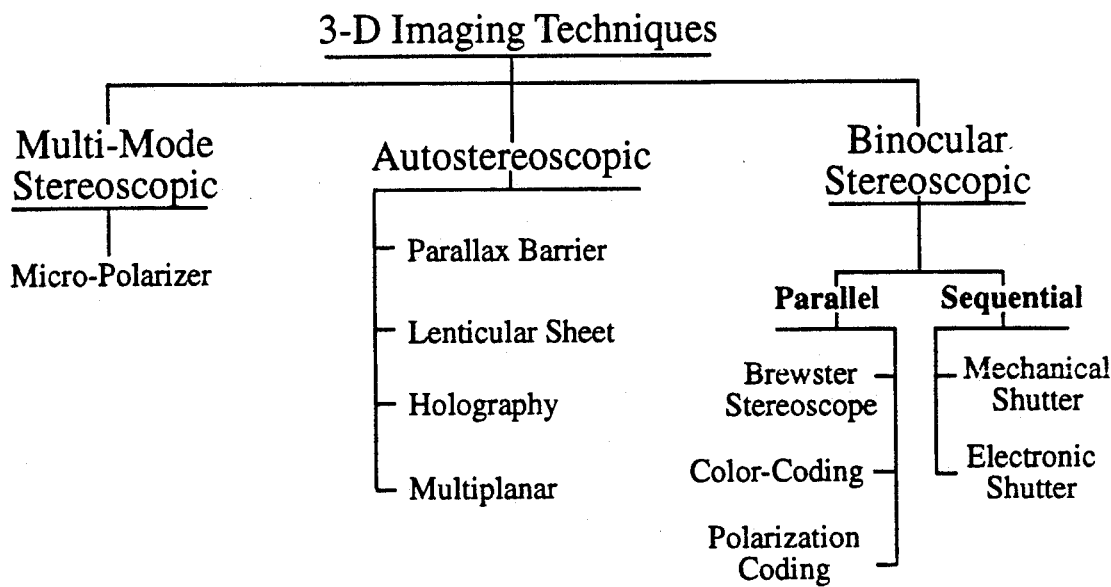
FIG. 1b illustrates the new classification of 3-D imaging techniques which includes the Multi-Mode Stereoscopic Imaging of the present invention.

The advantage of the binocular mode is the absence of the discrete viewing zones and the absence of viewing distance restrictions, but it requires polarized eye glasses. On the other hand, the auto mode does not require eye glasses but has discrete viewing zones and specific viewing distances to see stereo. Depending on the application, the ability to switch between the two modes could be desirable. Note, that prior art techniques do not posses the ability to switch between two modes, and for this reason, this invention is considered a new imaging class as illustrated by the classification of FIG. 1b. This new class combines the good features of both prior art stereo imaging classes.

Figure 6A:
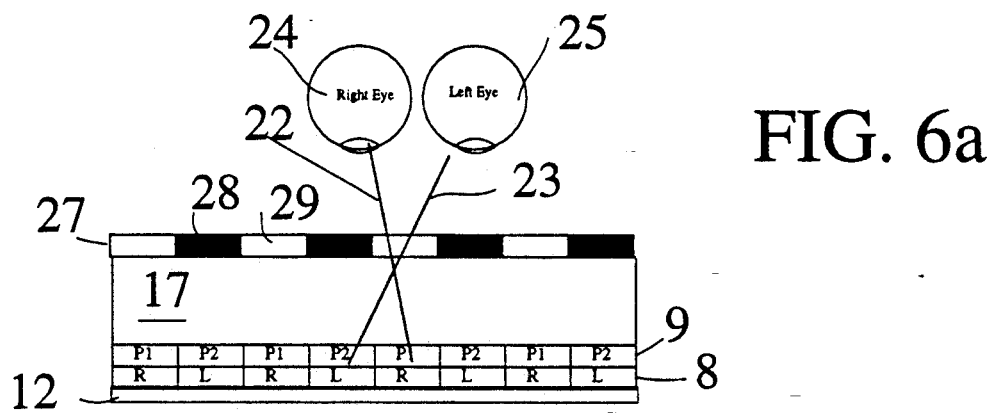
FIGS. 6a–b show cross sections illustrating the use of barrier strips to obtain the auto-stereo mode.
Figure 6B:
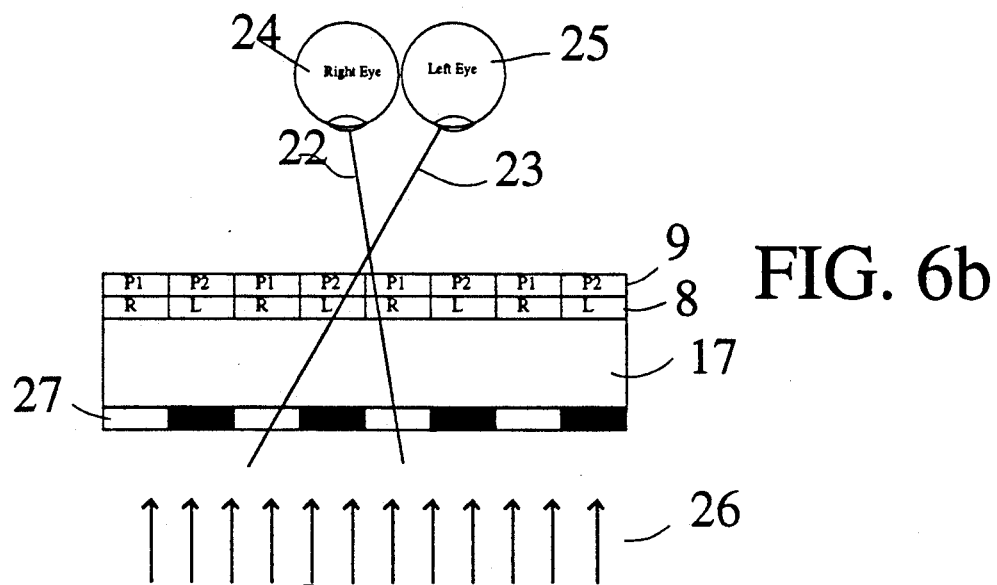

Another embodiment shown in FIGS. 6a-b achieves the auto-stereo mode by using a film 27 which has opaque regions 28 (barriers) and clear regions 29. In order to convert to the binocular mode, the film 27 is peeled away, but kept attached at the edges so that it can be placed again (remains registered) to switch back to the auto viewing mode.

Figure 7A:
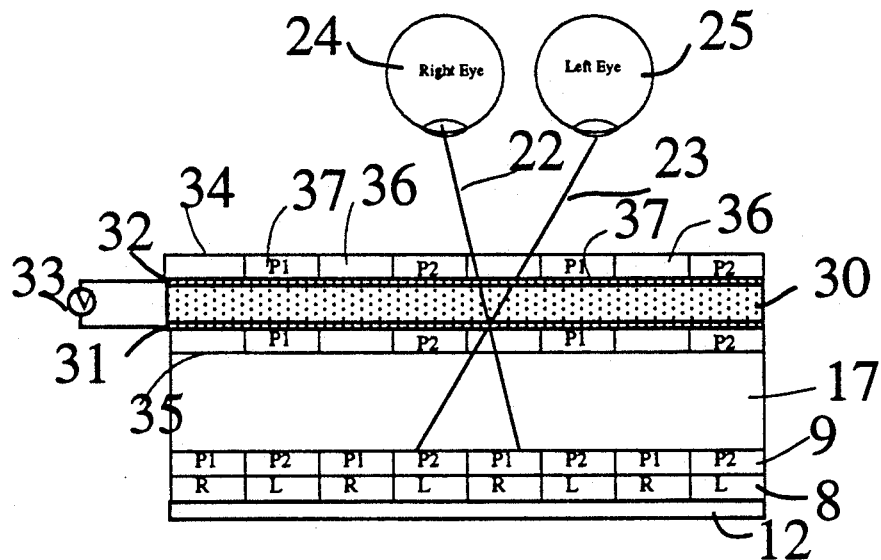
FIGS. 7a–b show cross sections illustrating the use of liquid crystal valve to electronically switch from the Auto-Stereo Mode to the Binocular Stereo Mode.
Figure 7B:
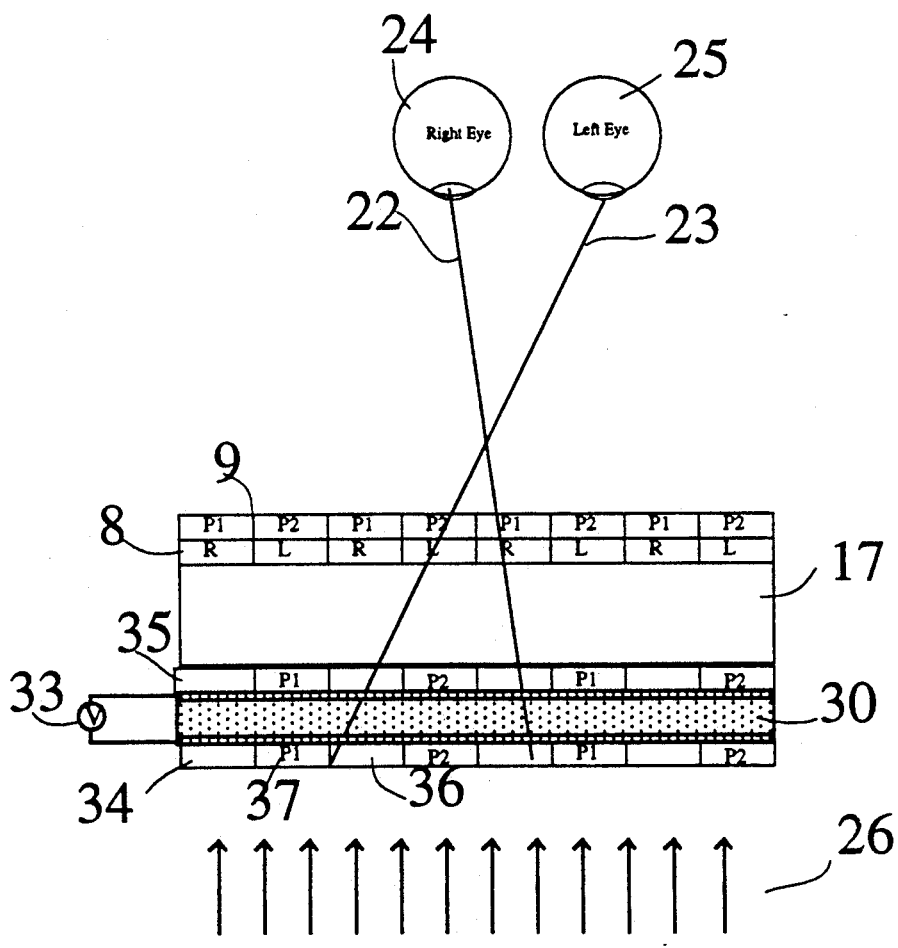

Electronic switching between auto and binocular stereo modes can be achieved by means of liquid crystal light valve in the system shown in FIGS. 7a and 7b representing the reflective and transmissive configurations respectively. The light valve is made of a 10–20 micron layer 30 of a twisted nematic liquid crystal sandwiched between two identical μPols 34, 35, coated respectively with transparent electrodes 32 and 31 (1000 angstrom indium-tin-oxide), connected to a voltage source 33. The binocular viewing mode is obtained when the applied voltage is zero, keeping regions 37 transparent, allowing polarized light to be transmitted to the eye. Regions 36 which always remain transparent, also transmit polarized light. To switch to the auto mode, a 5 to 10 volt signal is applied to exceed a switching threshold. This alters the birefringent property of the liquid crystal so that it rotates the polarization of light by 90 degrees. Now the regions 37 are switched to the opaque state, and a parallax barrier produces the auto viewing mode.

Figure 8A:
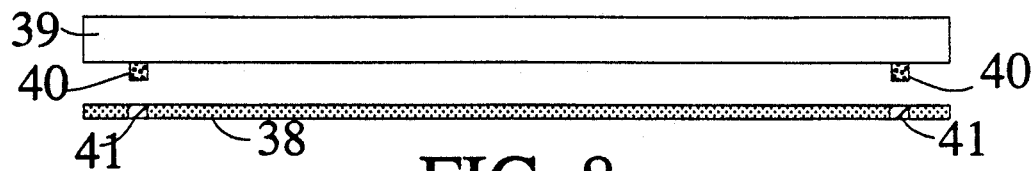
FIGS. 8a–d show cross sections of the construction of simple systems which have registration guides that allow the accurate insertion or removal of the auto-stereo components.
Figure 8B:
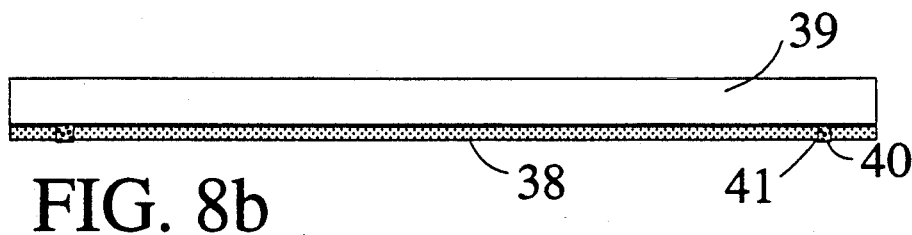
Figure 8C:
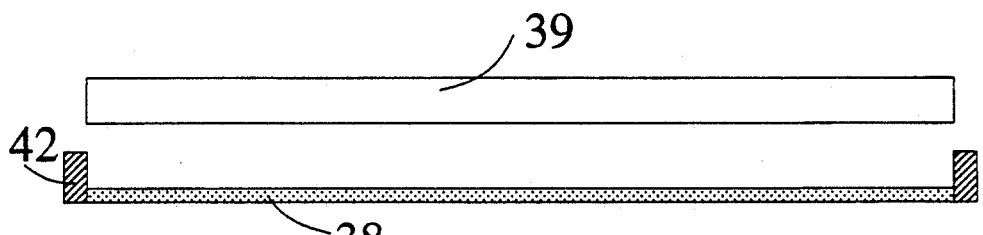
Figure 8D:
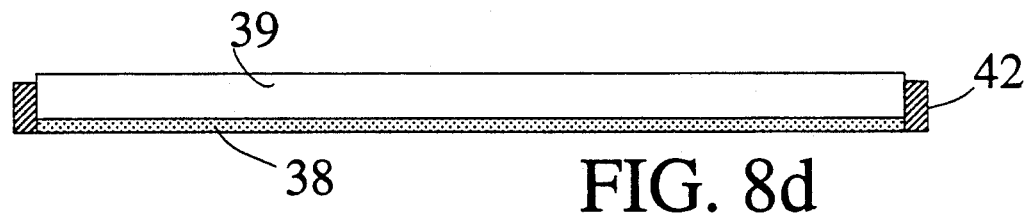

In FIGS. 8a-d, cross sections of manual embodiments are shown for achieving convertibility from the binocular mode to the auto mode and vice versa. The removable auto component 39 is a laminate of the substrate 17, the second μPol 18 and the third μPol 19, and the image component 38 is a laminate of the SMI 8, the first μPol 9, and the reflective backing 12 (needed only in reflective viewing). In FIG. 8a, the auto component 39 also has four cylindrical registration pins 40, 250 micron in diameter, and component 41 has 4 circular registration holes. Through the insertion of pins 40 in holes 41, the two components are attached to each other in a perfect registration and conversion to the auto mode is complete as shown in FIG. 8b. To switch back to the binocular mode, the two components are once again detached. In FIGS. 8c and 8d, the same result is achieved by using a registration frame 42 attached to the image component 38. Conversion to the auto mode is completed by inserting component 39 into the frame 42 and in contact with the image component 38.

Figure 9A:
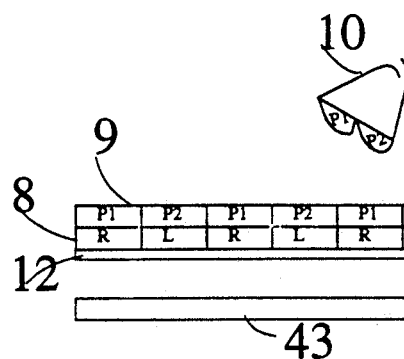
FIGS. 9a–b show cross sections of systems with ability to convert from 3-D viewing with glasses to 2-D viewing without glasses.
Figure 9A:
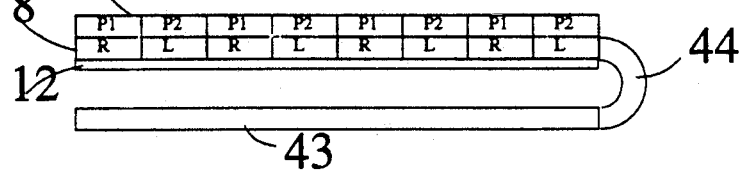
Figure 9B:
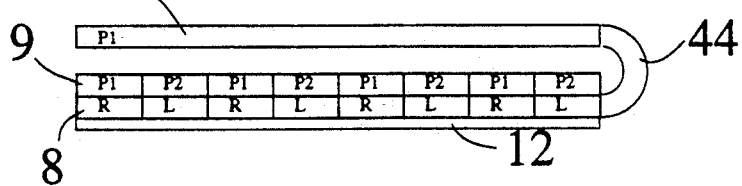

In FIG. 9, an embodiment is shown which makes it possible to convert the image from the 3-D binocular stereo mode to a flat 2-D that can viewed without glasses. A sheet polarizer 43 with a polarization state P1 is attached to the SMI film through a flexible section 44. When the polarizer 43 is in the back, FIG. 9a, the image is in the stereo mode. When the polarizer 43 is moved in front, FIG. 9b, the image is switched to the 2-D mode. In this case only the right pixels are viewed, while the left pixels covered with the P2 regions of μPol 9 are rendered opaque by means of the P1 polarizer 43.

Figure 10A:
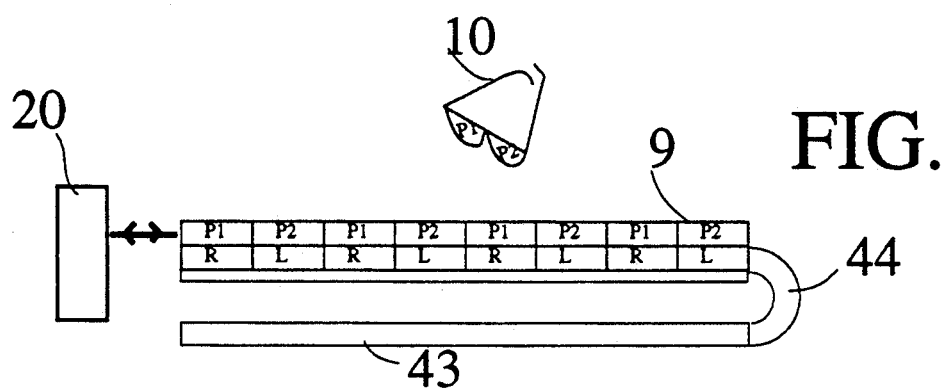
FIGS. 10a–b show cross sections of a user switchable viewing stereo mode, left only mode, or right only mode.
Figure 10B:
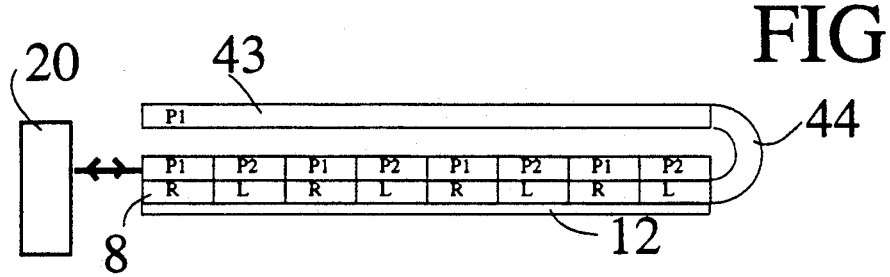

There are applications in which the users want to convert from the stereo mode to view either the left scene or the right scene, such an option is achievable by the system shown in FIG. 10. This system is essentially the same as that of FIG. 9 except that μPol 9 is allowed to have lateral motion by means of the actuator 20. The configuration of FIG. 10a with polarizer 43 in the back, is the stereo mode. It is then converted to the 2-D mode as in FIG. 10b by moving the polarizer to the front. Since transmission takes place only through the P1 regions, it is possible to switch from viewing the right scence to the left scene by moving the P1 to cover the left pixels.

Figure 11A:
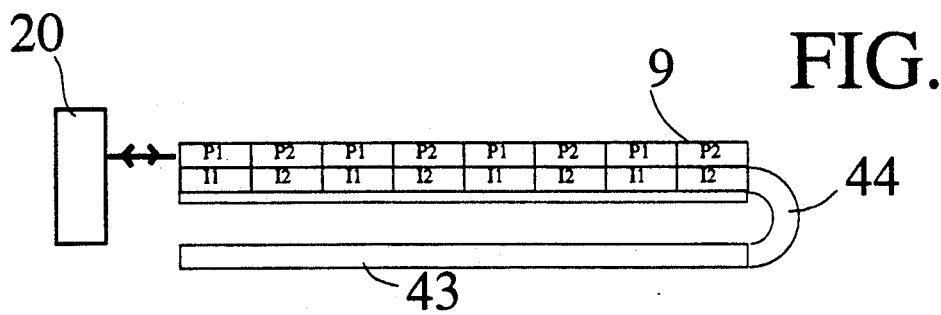
FIGS. 11a–b show cross sections of an embodiment of two different unrelated images which can be viewed in the merged mode, or switch to one image or the other mode.
Figure 11B:
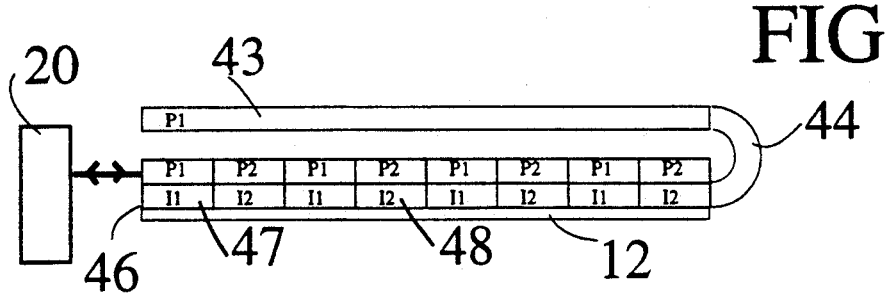

FIG. 11 is an embodiment of a convertible imaging system with two different images (not a stereo pair), which can switched from the merging viewing mode (both images together), to viewing either one or the other image. The operation of this system is identical to that of FIG. 10 except for the SMI plane 46 has image 1 pixels I1, 47 and image 2 pixels I2, 48 alternating.

What is claimed is:

1. A multi-mode stereoscopic imaging system which can be switched from the auto viewing mode without spectacles to the binocular viewing mode with glasses comprising:
   a. a stereo image component which is made of a spatially multiplexed image (SMI 8), a first micropolarizer array, μPol 9,
   b. a convertible auto stereo parallax barrier component which is made of a second μPol 18 fixed to a substrate 17 of an appropriate thickness, and a third μPol 19 which can be moved laterally with respect to said second μPol;
   c. means for converting the system between auto mode and binocular mode.

2. A multi-mode stereoscopic imaging system according to claim 1, wherein the the stereo image component is an SMI which is on a hard copy.

3. A multi-mode stereoscopic imaging system according to claim 1, wherein the the stereo image component is an SMI which is produced by any image display apparatus such as a CRT or liquid crystal display in the emissive or reflective mode.

4. A multi-mode stereoscopic imaging system according to claim 1, wherein the auto stereo parallax barrier is made of a film of alternating opaque and clear strips attached to a substrate of an appropriate thickness.

5. A multi-mode stereoscopic imaging system according to claim 1, wherein the auto stereo parallax barrier component is a liquid crystal light valve disposed between said second and third μPols.

6. A multi-mode stereoscopic imaging system according to claim 1, wherein the auto stereo component is disposed in front of the stereo image component for viewing in the reflective mode.

7. A multi-mode stereoscopic imaging system according to claim 1, wherein the auto stereo component is disposed in back of the stereo image component for viewing in the back-lit transmissive mode.

8. A multi-mode stereoscopic imaging system according to claim 5, wherein the means for converting is a voltage source for turning the liquid crystal light valve on or off.

9. A multi-mode stereoscopic imaging system according to claim 1, wherein the means for converting is an actuator which moves said third μPol laterally.

10. A multi-mode stereoscopic imaging system according to claim 1, wherein the means for converting the system from the auto mode to the binocular mode is a manual attachment and detachment of the auto stereo component to the stereo image component provided with registration means.

11. A multi-mode stereoscopic imaging system according to claim 1 further including a reflective backing disposed in contiguous relationship with said stereo image component.

12. A multi mode imaging system comprising:
a spatially multiplexed image of a stereo part of images, means for forming said spatially multiplexed imaged into images having first and second polarization states, and
means for reversibly blocking at least a portion of at least one of said first and second polarization states disposed in a plane parallel to the plane of said spatially multiplexed image.

13. A multimode imaging system according to claim 12 wherein said means for reversibly blocking includes a polarizer for blocking one of said polarization states and transmitting the other of said polarization states.

14. A multimode imaging system according to claim 12 wherein said means for reversibly blocking includes parallax barrier means having regions transparent to both said polarization states and regions opaque to both said polarization states disposed in alternating relationships with each other and in stacked relationships with said spatially multiplexed image and said means for forming.

15. A system according to claim 12 wherein said means for forming includes a first micropolarizer array having first and second groups of polarizing elements.

16. A system according to claim 12 wherein said images of said spatially multiplexed image are arranged in first and second strips which alternate with each other.

17. A system according to claim 12 wherein said means for forming includes a first micropolarizer array having first and second groups of polarizing elements arranged in alternating strips having a given periodicity and wherein said images of said spatially multiplexed image are arranged in alternating strips in registry with said first and second groups, respectively.

18. A system according to claim 12 further including a reflective element disposed in contiguous relationship with said spatially multiplexed image.

19. A system according to claim 12 wherein said means for reversibly blocking includes second and third micropolarizer arrays each having first and second groups of polarizing elements each of said first groups being spaced from each of said second group by an interposing element transparent to both said polarization states.

20. A multimode imaging system according to claim 13 wherein said means for blocking further includes means for positioning said polarizer such that, in one position, one of said polarization states is blocked and, in another position, neither of said polarization states is blocked.

21. A multimode imaging system according to claim 13 further including means for translating said means for forming to transmit each of said images of said stereo pair alternately in said other of said polarization states.

22. A multimode imaging system according to claim 14 wherein said parallax barrier means further includes a transparent substrate contiguous with said means for forming having a thickness sufficient to permit viewing of said spatially multiplexed image in 3-D.

23. A multimode imaging system according to claim 14 wherein said parallax barrier means further includes a transparent substrate contiguous with said spatially multiplexed image having a thickness sufficient to permit viewing of said spatially multiplexed images in 3-D.

24. A multimode imaging system according to claim 14 wherein said parallax barrier means includes second and third micropolarizer arrays each of which includes first and second polarization states disposed in alternating relationship with each other and a third group of elements transparent to both polarization states interposed between pairs of said first and second groups.

25. A multimode imaging system according to claim 14 wherein a portion of said parallax barrier means is moveable such that said opaque regions are eliminated.

26. A multimode imaging system according to claim 14 wherein a portion of said parallax barrier means is disposed in detachably stacked relationships with said spatially multiplexed image and said means for forming.

27. A multimode imaging system according to claim 14 wherein said means for reversibly blocking includes means connected to said barrier means for laterally translating a portion of said barrier means to render said opaque regions transparent.

28. A multimode imaging system according to claim 19 wherein said first and second groups of polarizing elements of said first array are arranged in strips which alternate with each other and have a given periodicity and wherein said first and second groups of polarizing elements of said second and third arrays are arranged in strips which alternate with each other and have a periodicity half said given periodicity.

29. A multimode imaging system according to claim 19 further including means connected to one of said second and third micropolarizer arrays for translating said second and third arrays relative to each other such that, in a first position, portions of said second and third arrays are opaque to both said polarization states and, in a second position, said second and third arrays are transparent to both polarization states.

30. A multimode imaging system according to claim 19 further including means interposed between said second and third arrays for rendering said first and second groups of elements opaque to said first and second polarization states.

31. A multimode imaging system according to claim 19 further including a transparent substrate contiguous with said means for forming having a thickness sufficient to permit viewing of said spatially multiplexed image in 3-D.

32. A multimode imaging system according to claim 19 further including a transparent substrate contiguous with said spatially multiplexed imaged having a thickness sufficient to permit viewing of said spatially multiplexed image in 3-D.

33. A multimode imaging system according to claim 24 wherein said first and second groups of polarizing elements of said first array are arranged in strips which alternate with each other and have a given periodicity and said first and second groups of polarizing elements of said second and third arrays are arranged in strips which alternate with each other and have a periodicity half said given periodicity.

34. A multimode imaging system according to claim 24 further including means connected to one of said second and third micropolarizer arrays for translating said second and third arrays relative to each other such that, in a first position, portions of said second and third arrays are opaque to both said polarization states and, in a second position, said second and third arrays are transparent to both polarization states.

35. A multimode imaging system according to claim 24 further including means interposed between said second and third arrays for rendering said first and second groups of elements opaque to said first and second polarization states.

36. A multimode imaging system according to claim 30 wherein said means for rendering said groups opaque is a liquid crystal light valve which rotates said polarization states by at least 90 degrees.

37. A multimode imaging system according to claim 35 wherein said means for rendering said groups opaque is a liquid crystal light valve which rotates said polarization states by at least 90 degrees.

* * * * *